United States Patent [19]

Morris

[11] Patent Number: 5,062,257

[45] Date of Patent: Nov. 5, 1991

[54] MOWING APPARATUS

[76] Inventor: William M. Morris, 84 Ingleston Rd., Wakerley, 4154, Australia

[21] Appl. No.: 550,087

[22] Filed: Jul. 9, 1990

[30] Foreign Application Priority Data

Jul. 13, 1989 [AU] Australia ............................ PJ5228
Dec. 8, 1989 [AU] Australia ............................ PJ7764

[51] Int. Cl.$^5$ ............................................ A01D 34/77
[52] U.S. Cl. ................................. 56/11.1; 56/14.8; 56/255; 56/295; 56/DIG. 6
[58] Field of Search ................ 56/14.8, 1, 11.1, 11.8, 56/15.6, 255, 295, DIG. 3, DIG. 6, DIG. 9, DIG. 13, DIG. 20

[56] References Cited

U.S. PATENT DOCUMENTS

| | | | |
|---|---|---|---|
| 3,191,369 | 6/1965 | Cowan | 56/14.8 |
| 3,320,733 | 5/1967 | Kirk | 56/295 |
| 3,474,608 | 10/1969 | Frick | 56/255 |
| 4,362,007 | 12/1982 | Kennedy et al. | 56/295 |
| 4,962,630 | 10/1990 | Jones | 56/295 |

Primary Examiner—Terry L. Melius
Attorney, Agent, or Firm—Griffin, Branigan & Butler

[57] ABSTRACT

A grass mowing or cutting machine suitable for towing by general application vehicles is disclosed. The machine is operated by its advance and comprises a wheeled frame having a horizontal cutting disc which rotates about a vertical axis. A drive mechanism connects the cutting disc to the wheel(s) of the wheeled frame so that when the mowing apparatus is pulled or pushed, the cutting disc will be rotated by the rotation of the wheel(s). A gearing mechanism is typically provided between the cutting disc and the wheel(s). The cutting disc is preferably of web-like construction and includes aerodynamics portions to exert a downward force on the disc as it rotates through the air. The moving apparatus is designed for relatively high speed towing.

10 Claims, 7 Drawing Sheets

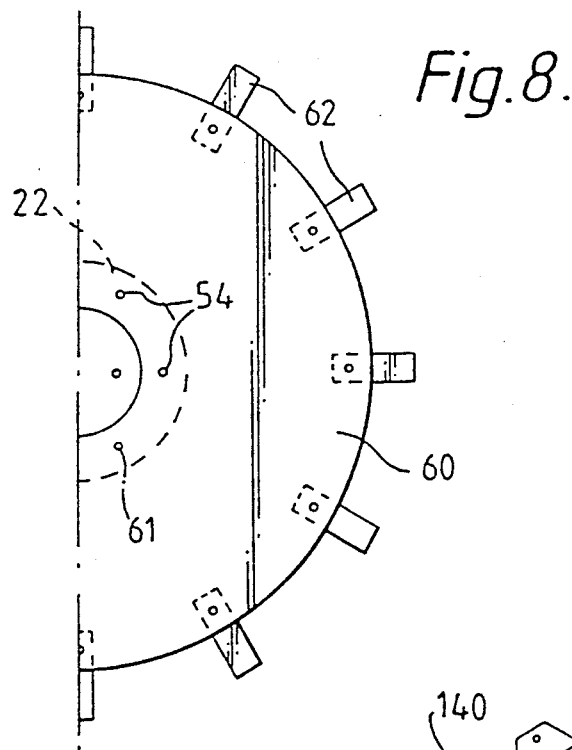
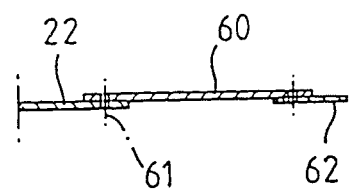
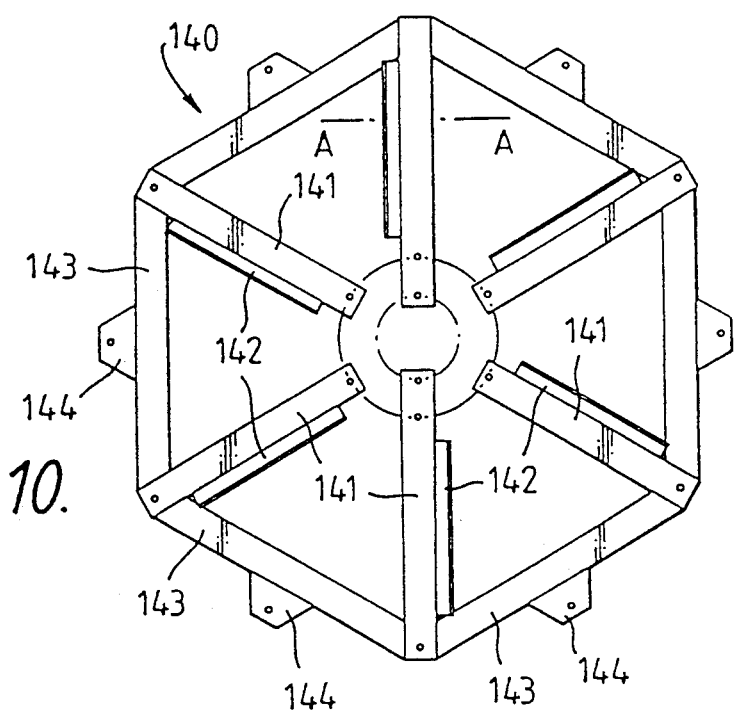
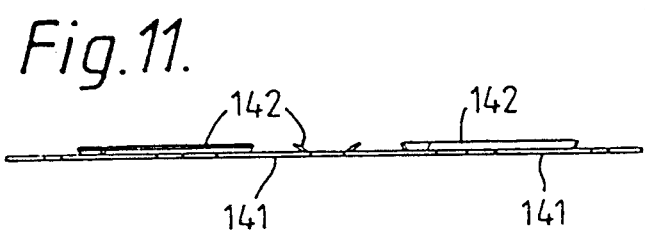
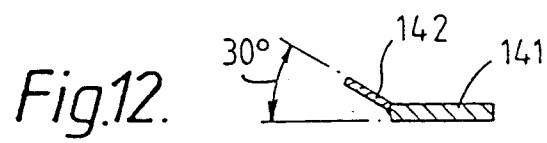

MOWING APPARATUS

This invention relates to mowing apparatus. In particular, the invention is directed to a towable mowing machine (or "mower") having a grass cutting or slashing mechanism which is driven by the advance of the mower.

Conventional lawn mowers are generally limited to cutting grassed areas less than about 0.2 hectare (0.5 acre) as it is too tiring and time consuming to push a lawn mower over greater areas. For larger areas, it has been necessary to use motor-propelled mowers such as ride-on tractors having cutting blades thereunder, or slashing machines which are affixed to tractors and positively driven from the tractor's PTO facility.

Both the ride-on mowers and the tractor slashers possess several inherent disadvantages. First, they are relatively expensive and beyond the financial reach of many property owners. Moreover, if they are being used only intermittently (e.g. once a month), they are not cost efficient. Secondly, such mowers, particularly ride-on mowers, are quite slow. If large areas such as grassed airfields, or long sections such as farm headlands or fence boundaries, are to be mowed with conventional ride-on mowers or tractor slashers, the grass cutting task is considerably time consuming and tedious. Thirdly, the known mowers require considerable maintenance. The ride-on mowers in particular, must be serviced regularly.

Although mowers which are operated by their advance are known, such mowers are limited to small push mowers with tubular cutters, and are unsuitable for cutting large grassed areas.

It is an object of the present invention to provide an improved mowing apparatus which overcomes or substantially alleviates at least some of the above problems of known mowers, or at least provides the public with a useful choice.

It is a further object of this invention to provide an improved mowing apparatus which is both simple and economic to construct yet capable of relatively fast operation, with minimum maintenance required.

In one broad form, the present invention provides mowing apparatus for cutting grass or the like, the apparatus being adapted in use to be pulled or pushed by a vehicle, and comprising:
  a wheeled frame;
  a cutting member rotatable about a vertical axis; and
  drive means interconnecting at least one wheel of the wheeled frame to the cutting member whereby the cutting member is rotated by rotation of the wheel(s).

The mowing apparatus of this invention does not possess a dedicated engine and hence manufacturing and maintenance costs are greatly reduced. The drive for the cutting member is derived from the rotation of the wheels.

Furthermore, the mowing apparatus of this invention does not require a specialist pulling vehicle, such as a tractor having a PTO facility, but can be used with any vehicle which is suitable for the terrain to be mowed, e.g. a four wheel drive vehicle, a light utility vehicle or even a conventional sedan vehicle. These vehicles can otherwise be used for the conventional functions when not pulling the mowing apparatus of this invention.

The invention is particularly suitable for persons who own hobby farms or similar areas of land of one to five hectares which are too small to justify the expense of a dedicated ride-on mower or tractor/slasher combination. Such persons can obtain the mowing apparatus of this invention at a fraction of the cost of a ride-on mower or tractor/slasher combination, and use the mowing apparatus in combination with a conventional road or off-road vehicle when required.

The wheeled frame is typically a simple chassis mounted on a pair of wheels and providing a cover for the cutting mechanism. The wheels may be conventional rubber-tired wheels, but toothed steel wheels may be used to provide better traction for slower speed mowers requiring higher gearing.

The cutting member is preferably a horizontal disc having a plurality of cutting blades spaced around its periphery, the cutting blades being chosen to suit the type of cutting required.

The drive means preferably comprises a gear box mechanism interposed between the wheel(s) and the cutting disc. In one embodiment, the complete rear wheels, axles and mid-mounted differential assembly of an automobile, commonly available at low cost from a wrecking yard, is used to provide the wheels, axles and gearbox of the mowing machine. The cutting disc is mounted on the centre stub axle of the differential. The differential thereby serves to provide the required gearing as well as the change in orientation of the axis of rotation between the wheels and the cutting disc.

Typically, the cutting disc is geared to rotate at twice the speed of the wheel(s) from which it is driven. However, the gear ratio can be varied to suit design specifications. For example, in areas where high towing speeds are difficult to achieve, a higher gearing may be necessary so that a fast cutting speed is achieved even with low vehicle speed.

The drive means may also suitably comprise a clutch mechanism to enable the cutting member to be disengaged when the mowing apparatus is being towed in a non-operative mode. The clutch can also be used to enable operating speed (i.e. gearing ratio) to be changed quickly and simply by the operator.

Advantageously, the mowing apparatus includes a height adjustment mechanism for varying the height of the grass cutting blades.

The axis of the cutting disc can be offset from the wheel axle to enable a cutting width greater than the wheel spacing to be obtained.

When trailer vehicles such as the mower of this invention are towed at high speeds, they have a tendency to "float", and the traction between the wheels of the towed vehicle and the ground is reduced. In order to reduce such "floating" effect at high speeds, the present invention also provides an improved grass cutting means.

In one broad form, the improved grass cutting means of the invention comprises a rotatable member having at least one aerodynamic member thereon, such as a wing member or fan blade member, which imparts a downward aerodynamic force on the rotatable member in operation. Typically, the rotatable member includes a plurality of cutting blades each having an upswept portion which imparts a downward force in use.

In order that the invention may be more fully understood and put into practice, preferred embodiments thereof will now be described with reference to the accompanying drawings, in which:

FIG. 8 is a plan of a manicure disc assembly;

FIG. 9 is an elevation of the disc assembly of FIG. 8;

FIG. 10 is a plan view of a preferred embodiment of the grass cutting means of the invention;

FIG. 11 is a side elevational view of the grass cutting means of FIG. 10; and

FIG. 12 is a sectional view along A—A of FIG. 10.

Figure 1:
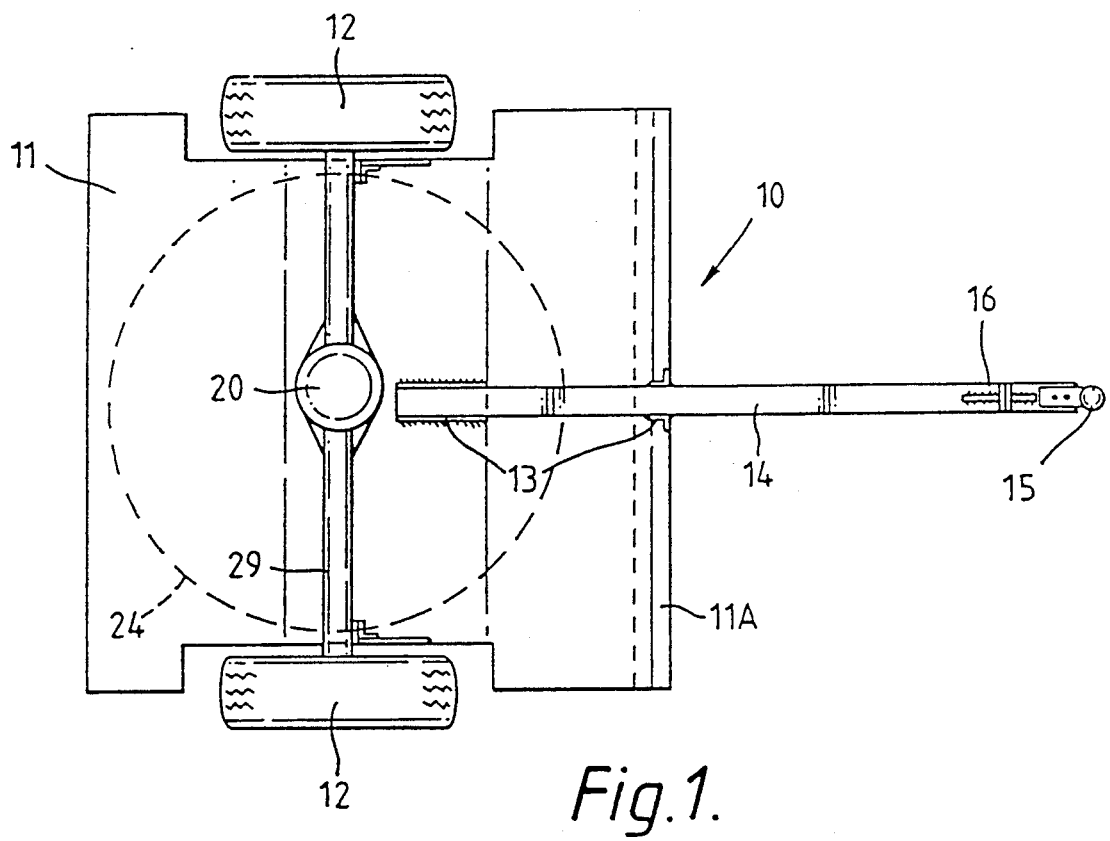
FIG. 1 is a plan view of the mowing apparatus of one embodiment of the invention.
Figure 2:
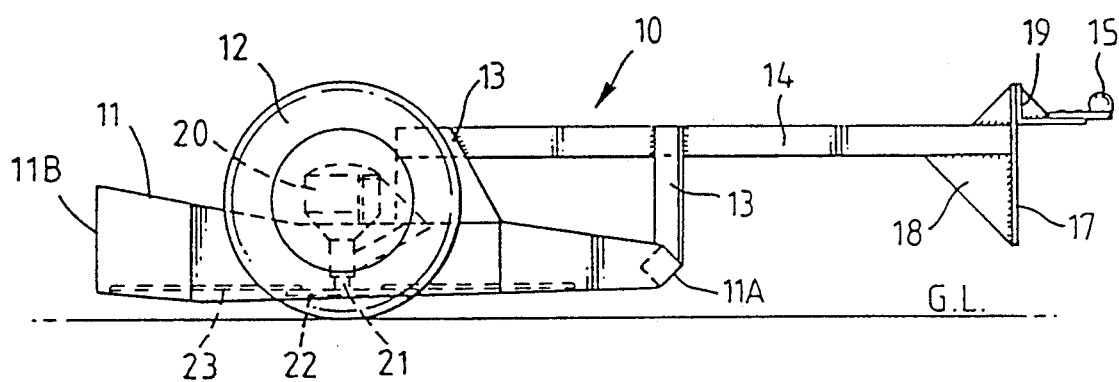
FIG. 2 is a side elevational view of the mowing apparatus of FIG. 1.

The mowing apparatus of the embodiment illustrated in FIGS. 1 and 2 is in the form of a towable mower 10 comprising a frame 11 mounted on a pair of spaced wheels 12. The frame 11 acts as a cover or housing for the cutting blades, and includes a horizontal striker bar 11A at its forward end, and an opening 11B at its rear end to allow discharge of grass clippings. The frame or housing 11 is connected to a draw bar 14 by suitable brace members 13 as can be seen more clearly in FIG. 2. The housing of the mower may be aerodynamically shaped and preferably includes an arcuate upswept portion (not shown) opening to the rear. This shaping not only gives the mower a commercially attractive appearance, but also enables a greater volume of air to be mixed with the cut grass clippings. This facilitates the discharge of the cut grass clippings from the rear of the housing and avoids clogging of the rear output opening which, in turn, enables the mower to be operated (towed) at greater speeds. The upswept aerodynamic shape also assists in holding down the mower on the ground at high speeds. Further, the air pressure at the front is greater than that at the rear during travel, thereby guiding air flow automatically from front to rear.

The wheels 12 may be rubber tired as shown. For slower speed mowers requiring higher gearing, good traction is required between the wheels and the ground. To provide increased traction, toothed steel wheels can be used.

A standard hitch assembly 15 is connected to the leading end of the draw bar 14 to enable the mower 10 to be towed behind a vehicle, such as a conventional utility vehicle or a four wheel drive vehicle. To allow for tow bar connections of different heights, the hitch assembly 15 is adjustably mounted to the forward end of the draw bar 14. The adjustable mounting can be achieved by fixing a vertical adjustment plate 17 at the forward end of the draw bar 14 by suitable gussets 18 welded thereto. The adjustment plate 17 comprises a series of spaced holes. The hitch assembly 15 also includes a vertical plate 19 having a plurality of spaced holes of similar spacing. In this manner, the plate 19 can be bolted to the adjustment plate 17 at variable heights to enable the hitch assembly 15 to accommodate tow bar attachments of different heights yet maintain the mower 10 in a substantially horizontal attitude.

In an alternative embodiment, the hitch coupling 15 is bolted onto drawbar 14 by bolts having steel shims thereon. The height of hitch coupling 15 can be adjusted by arranging the required number of shims between the hitch coupling 15 and drawbar 14, either above or below the drawbar.

The wheels 12 are mounted on aligned axles enclosed within axle housings 29. The frame or housing 11 may be mounted on the wheels by angle members welded to existing spring saddles on the axle housings and fixed to the frame or housing 11 by suitable bolts. The wheel axles are connected to a centre-mounted gearbox or differential 20 which provides a gearing ratio of approximately 3:1 for the stub axle 21 of the differential 20. That is, the stub axle 21 rotates at twice the speed of the wheels 12. The differential 20 may be either of the fixed or limited slip type of differential. The complete wheel, axle and differential assembly may typically be obtained from a car wrecking yard at low cost. Alternatively, the gearbox can be a purpose made gearbox, incorporating a neutral gear as well as variable gear ratios.

The grass cutting means of the mower 10 comprises a disc 22 mounted on the stub axle 21, and a plurality of grass cutting blades 23 spaced around the periphery of the cutting disc 22. This arrangement provides a cutting circle 24 as shown in FIG. 1. The cutting circle can be made greater than the spacing between the wheels 12 by offsetting the cutting means from the axis of the wheels.

The disc 22 is typically a 12 mm steel mounting plate which is mounted to the stub axle 21 of the differential by means of a mounting flange fitted through a centre bore in the disc 22, and welded to the disc 22.

Figure 3:
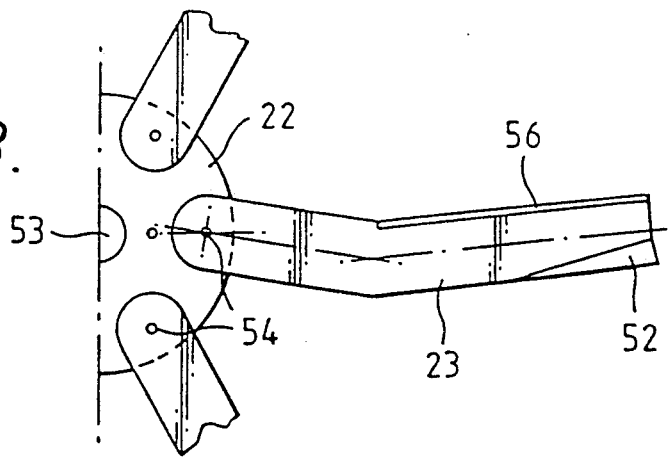
FIG. 3 is a plan of a general purpose blade.
Figure 4:
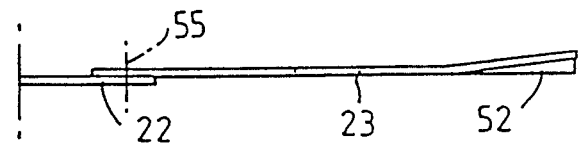
FIG. 4 is an elevation of the blade of FIG. 3.

As shown in FIGS. 3 and 4, the mounting disc 22 comprises a series of spaced holes 54 to which are mounted six blades 23 by suitable (high tension) bolts 55. The blades 23 are general purpose blades and have a cutting edge 56 and an upturned (15°) trailing edge 52 for deflecting grass cuttings.

Figure 5:
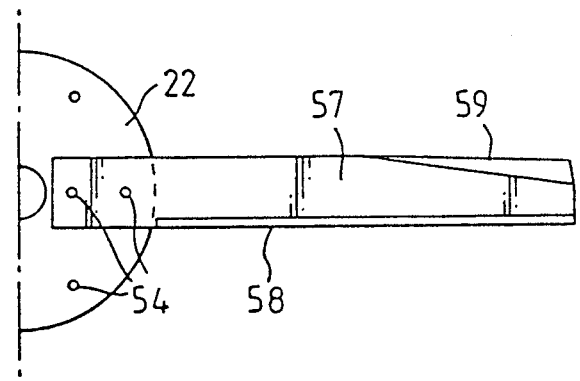
FIG. 5 is a plan of a rough-out blade.
Figure 6:
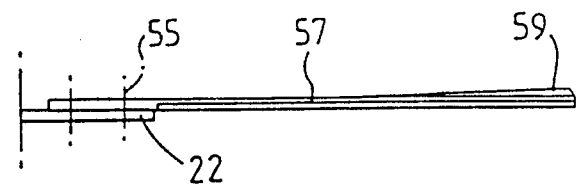
FIG. 6 is an elevation of the blade of FIG. 5.
Figure 7:
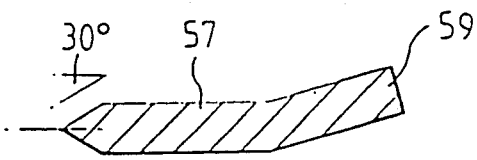
FIG. 7 is a sectional view of the blade of FIG. 5.

An alternative blade 57 (shown in FIGS. 5-7) is a rough-out blade having a similar cutting edge 58 and upturned trailing edge 59 as the general purpose blade 23, but has a longer cutting edge. A pair of blades 57, diametrically opposed, are double bolted at a fixed angle to the disc 22.

For grass trimming, a manicure disc as shown in FIGS. 8-9 can be used. The manicure disc 60 is bolted to the mounting disc 22 by suitable fasteners 61, and a series of short blades 62 are mounted around its periphery. The blades 62 may be conventional lawn mower blades.

In an alternative embodiment, the rigid blades are substituted by flexible cutters, such as braided metal wire, plastic wire or the like.

In use, the hitch assembly 15 is connected to the tow bar attachment of a suitable vehicle and the mower 10 is pulled behind the vehicle. Rotation of the wheels 12 of the mower will cause the cutting disc 21 and blades 23 to spin rapidly thereby cutting the grass in a slashing motion.

At very high speed rotation, some cutting discs may tend to float over the grass, and hence not cut efficiently. This invention also provides an improved grass cutting means which overcomes this problem. As shown in FIGS. 10-12, the improved grass cutting means is in the form of a disc 140 comprising a plurality of flat radial arm members 141. In the illustrated embodiment, six radial arm members 141 are arranged at equal angular spacings of 60 degrees. The inner ends of the arm members 141 are bolted to the mounting disc 22 which is fixed to the bottom of the driven shaft of the mower. The outer ends of the radial arms 141 are interconnected by flat chord members 143 as shown more clearly in FIG. 10. A bracket 144 is centre mounted to each chord member 143 for fixing of cutting blades.

Each radial arm member 141 is provided with an upswept wing or fan blade portion 142, typically at an angle of approximately 30 degrees to the horizontal.

The cutting disc of FIGS. 10-12 has a number of advantages over conventional cutting discs. First, the web-like construction of the cutting disc 140 provides a strong rigid member having a much lower weight than a conventional solid disc cutter. Secondly, as the cutting disc 140 rotates, the upswept wing portions 142 on the radial arms 141 act as fan blades creating a suction effect which pulls the cutting disc, and hence the mower, towards the ground. This provides added traction between the wheels of the mower and the ground, and overcomes or at least alleviates the "floating" effect at high speeds. Furthermore, the suction effect causes the grass to stand upright for cutting, either forward or rear of the cutting blades. As a result, the cutting disc 140 provides a more efficient cutting action and is operatable at higher speeds than conventional cutting discs.

Another embodiment of the invention (shown in FIGS. 13 and 14) includes a number of additions or modifications to the embodiment of FIGS. 1 and 2. First, the gearbox 74 is adjustably mounted on a gearbox mount bracket 77 on the housing 71 of the mower. The mounting of the gearbox 74 relative to the mounting bracket 77 can be adjusted by loosening the lock nuts 85, adjusting the height of the gearbox 74 relative to the mounting bracket 77, and then retightening the lock nuts 85. A screw height adjustment mechanism 80 enables fine adjustment of the height of the gearbox 74. The screw height adjustment mechanism 80 may comprise a lead screw having a handle thereon, the bottom end of the lead screw being journalled in a bearing mounted on the housing 71, and the lead screw having a threaded nut 84 thereon which is connected to the gearbox 74. Since the grass cutting disc is connected to the output shaft of the gearbox 74, variation of the mounting height of the gearbox 74 results in variation in the cutting height of the cutting 86 disc above ground level.

Secondly, the wheels 72 are each mounted on "flexible" bearings 81 which, in turn, are affixed to respective flexible bearing mount brackets 82.

Thirdly, an adjustable pivotal connection 87 is provided between the drawbar 79 and the mount bracket 77. The pivotal connection 87 to the mount bracket 77 can be varied in height simply by removing its pivot pin and reinserting it through the aligned apertures in the mount bracket at the desired height.

Figure 13:
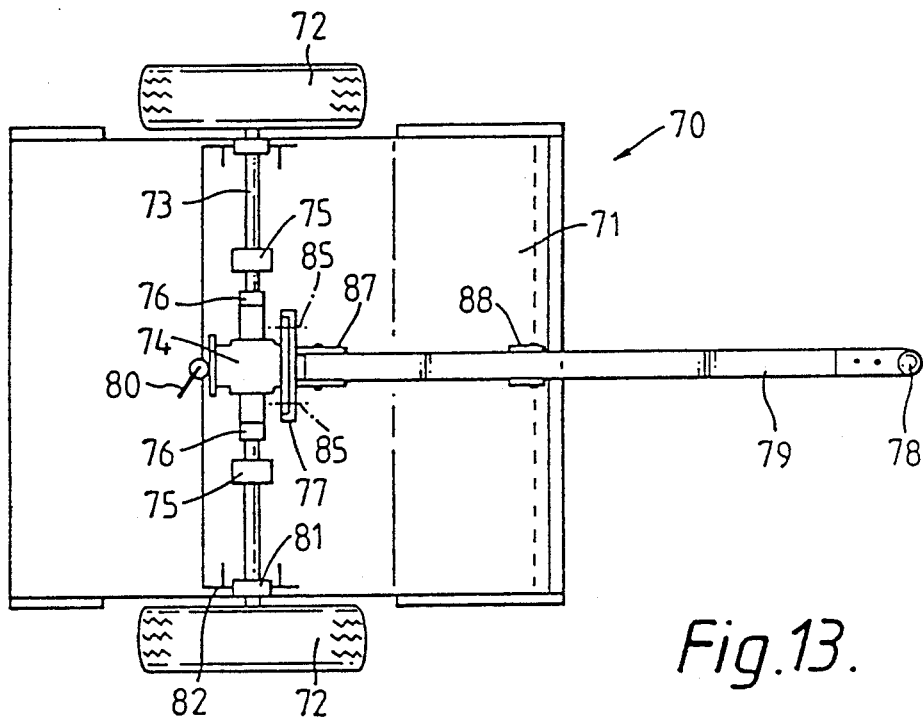
FIG. 13 is a plan view of a towable mower according to a further of the invention.

Fourthly, the axle shaft 73 of each wheel 72 is connected to a respective input shaft of the gearbox 74 via a respective clutch 75 and a universal joint coupling 76 illustrated schematically in FIG. 13.

Figure 14:
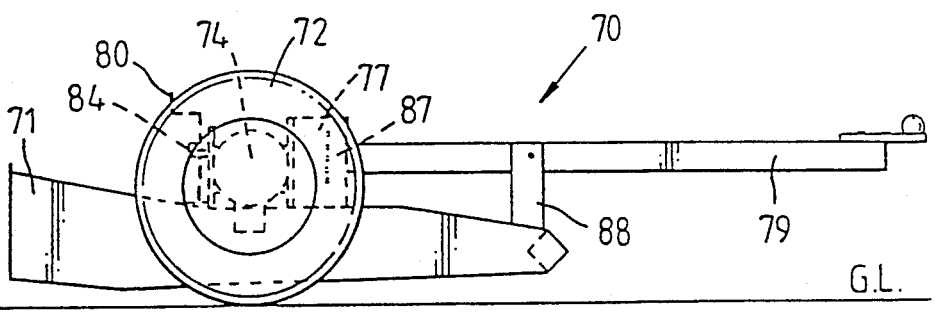
FIG. 14 is a side elevational view of the mower of FIG. 13.

It will be apparent to those skilled in the art that the mower 70 illustrated in FIGS. 13 and 14 possesses several advantageous features. Namely, (a) the height of the cutting disc 86 above ground level can be adjusted simply by rotating the handle connected to the lead screw of the height adjuster 80. Since the axial shafts 73 of the wheel 72 are connected to the gearbox via universal joints 76, the gearbox can be raised and lowered relative to the common wheel axis.

(b) The clutches 75 interposed between the wheels 72 and the gearbox 74 provide a differential effect when the mower 70 is turning.

(c) The flexible bearings 81 allow adjustment of wheel camber in response to adjustment of the height of the gearbox and associated cutting disc.

(d) The height of the hitch 78 on drawbar 79 can be adjusted simply by selecting a different height setting of the pivot connection 87 between the drawbar and the mounting bracket 77.

The mower of the abovedescribed embodiments is particularly suitable for mowing large areas or long strips at relatively high speeds, e.g. grass airfields, road edges in rural areas, farm headlands and fence boundary areas. Using the mower 10 towed behind a conventional four wheel drive vehicle, a grass airfield of approximately 32 hectares (80 acres) was able to be mowed in not much more than one hour at speeds up to 60 kilometers per hour.

Since the mower can be towed behind a wide range of vehicles, it can be used by many property owners who do not have specialised farm machinery. Furthermore, due to its simple yet sturdy construction, the mower 10 can be constructed at relatively little cost and maintenance requirements are minimised.

Figure 15:
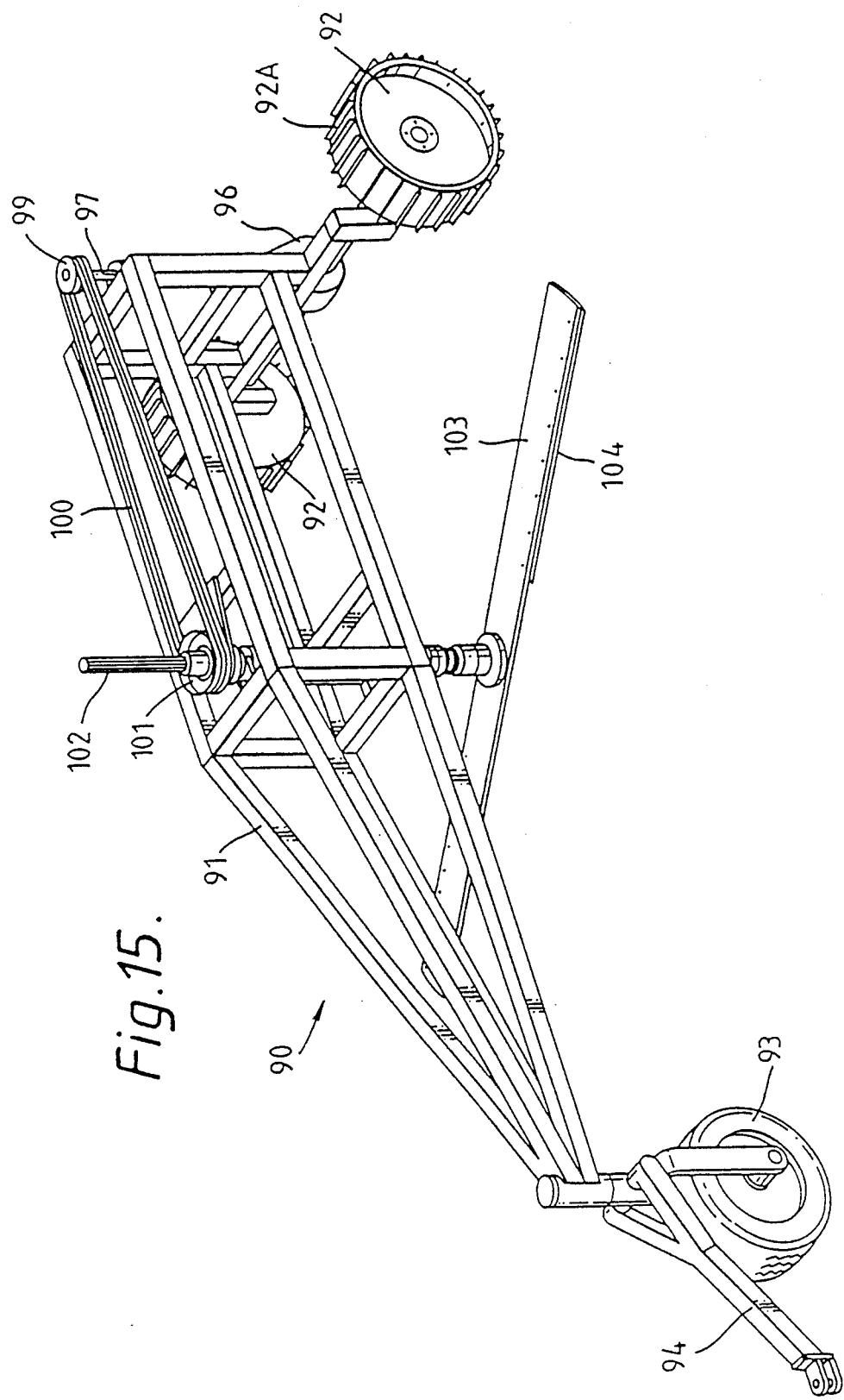
FIG. 15 is a perspective view of a heavy duty mower according to another embodiment of the invention.
Figure 16:
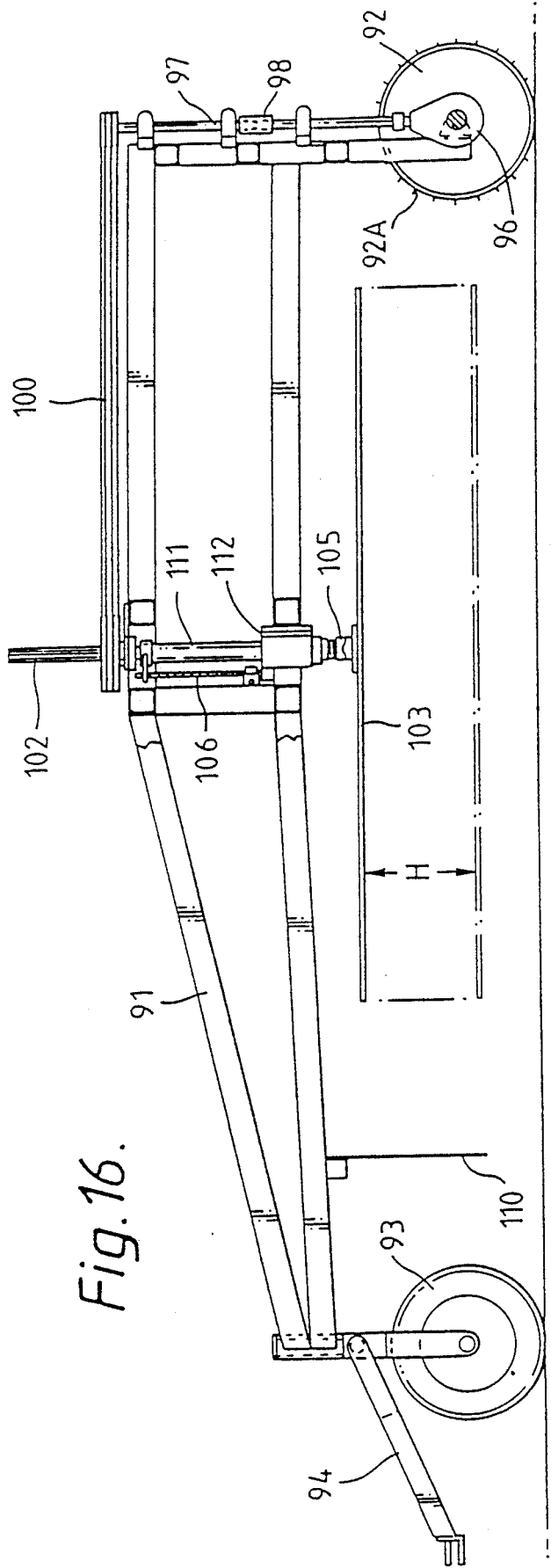
FIG. 16 is a side elevational view of the mower of FIG. 15.
Figure 17:
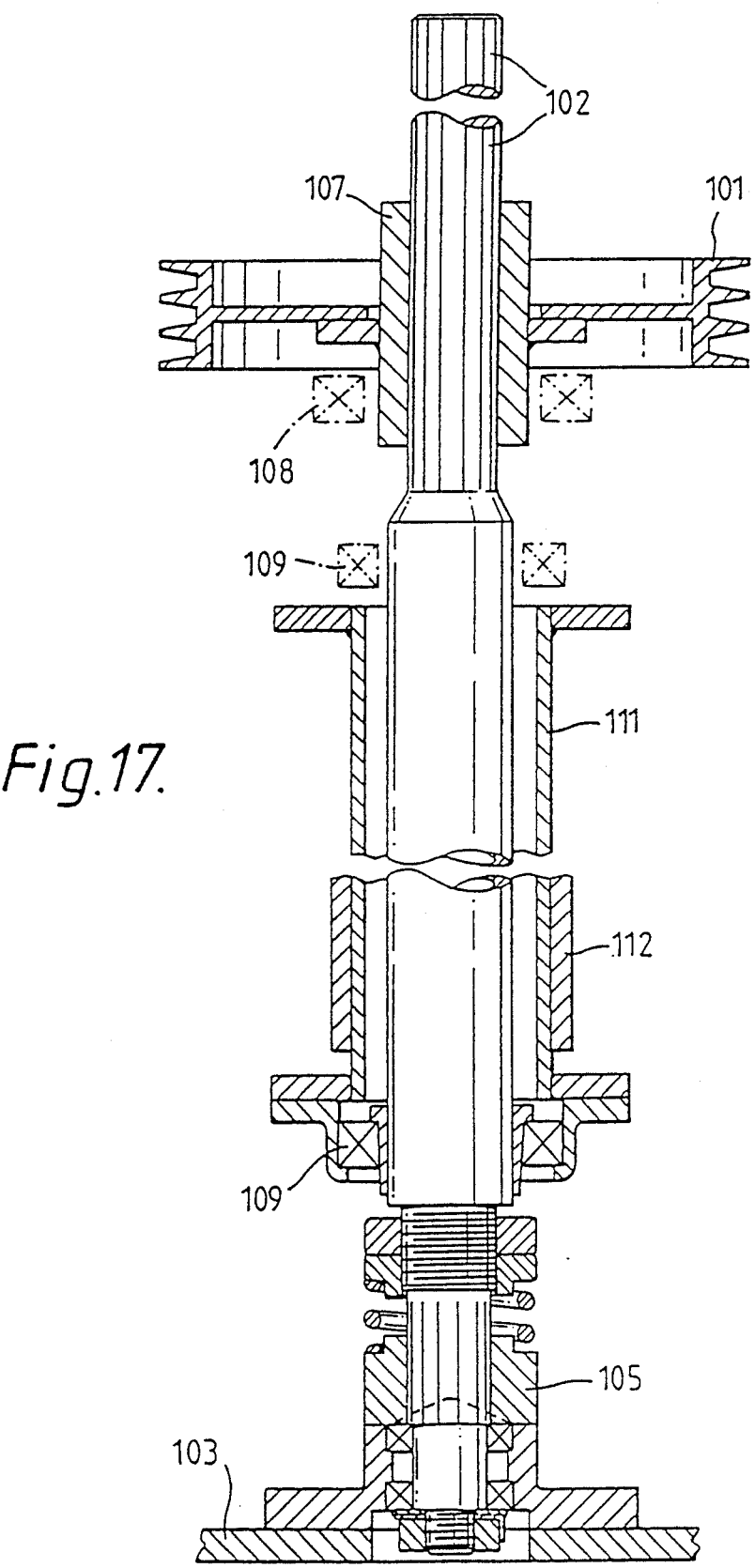
FIG. 17 is a part sectional elevation of the shaft assembly of the mower of FIG. 15.

FIGS. 15 to 17 illustrate a further embodiment of the invention which is suitable for "heavy duty" use, such as cutting brush regrowth. The towable mower or slasher 90 of this embodiment comprises a steel frame 91 mounted on a rear pair of coaxial wheels 92 and a front steerable wheel 93. The steerable wheel 93 is connected to a drawbar 94 and is steered by that drawbar.

The rear wheels 92, which preferably are steel wheels with a series of teeth or radial protrusions 92A around their circumference, have their respective axial shafts connected to a gearbox 96 which, for example, may be a conventional automobile differential. The output or drive shaft 97 of the gearbox 96 is journalled in bearings at the rear of the frame 91 in a vertical orientation and has a pulley 99 mounted on the top thereof. A coupling 98 may suitably be provided in the drive shaft 97 to disengage the pulley 99 from the gearbox and thereby place the mower in a neutral mode, e.g. for travelling between sites.

The pulley 99 is a drive pulley which drives a driven pulley 101 via an endless "V" belt drive 100. The driven pulley 101 is, in turn, mounted on a splined or keyed shaft 102 which has a cutting blade 103 mounted at the bottom end thereof. The cutting blade 103 is suitably provided with hardened cutting edges 104. A guard 110 (omitted from FIG. 15 for clarity) is preferably provided forward of the cutting blade 103 for safety reasons.

The mower includes a screw height adjustment mechanism 106. The screw height adjustment mechanism comprises a lead screw member whose bottom end is journalled in a bearing mounted on the frame 91, and which is rotatable within a threaded member connected to the shaft bearing housing of shaft 102. Rotation of the lead screw of the screw height adjustment mechanism 106 will therefore raise and lower the shaft 102, and hence the cutting blade 103.

The construction of the shaft 102 and its mounting is shown in more detail in FIG. 17. The top end of shaft 102 is splined or keyed in a collar 107 which is rotatably mounted in bearings 108. The driven pulley 101 is mounted to the collar 107. The shaft 102 is able to slide axially within its collar 107 while still receiving drive from the pulley 101.

The intermediate portion of the shaft 102 is journalled in a pair of bearings 109 and is encased in a tubular shaft bearing housing 111 to which the screw height adjuster 106 is connected. The housing 111 is slidably mounted within a bearing housing slide block 112 which is mounted to the frame 91 of the mower.

The cutter blade 103 is mounted to the bottom end of the shaft 102. As the lead screw of the screw height adjustment mechanism 106 is rotated, the shaft bearing housing 111 is moved up or down through the slide block 112, causing the top end of the shaft 102 to move axially through the collar 107. As the shaft 102 is raised and lowered, the cutting blade 103 mounted at the bottom end thereof is similarly raised and lowered. In this manner, the cutting blade 103 can be adjusted through a height H (FIG. 16) simply by rotating the lead screw in the screw height adjustment mechanism 106.

Preferably, a spring-loaded cam drive clutch 105 is interposed between the mounting of the cutting blade 103 and the shaft 102, as shown in FIG. 17. The spring-loaded cam drive clutch 105 acts as a torque limiter so that if the cutting blade 103 strikes a heavy object such as a log or rock, the drive shaft 102 will slip on the cam thereby avoiding damage to the mower and increasing the safety of operation. In addition, the belt drive interposed between the wheels 92 and the cutting blade 103 provides slip in the event of excessive torque, thereby providing added protection for the mower, and particularly the gearbox 96.

The heavy duty construction of the mower frame 91 and the cutting blade 103 renders this embodiment of the invention particularly suitable for cutting or slashing dense grass, scrub regrowth and the like.

Furthermore, the open frame of the embodiment of FIGS. 15 to 17 enables a large cutting circle to be obtained since the cutting blade is mounted offset from the wheel axis and the cutting circle can therefore be greater than the wheel spacing. In the illustrated embodiment, a cutting blade diameter of 3.6 meters is provided.

Figure 18:
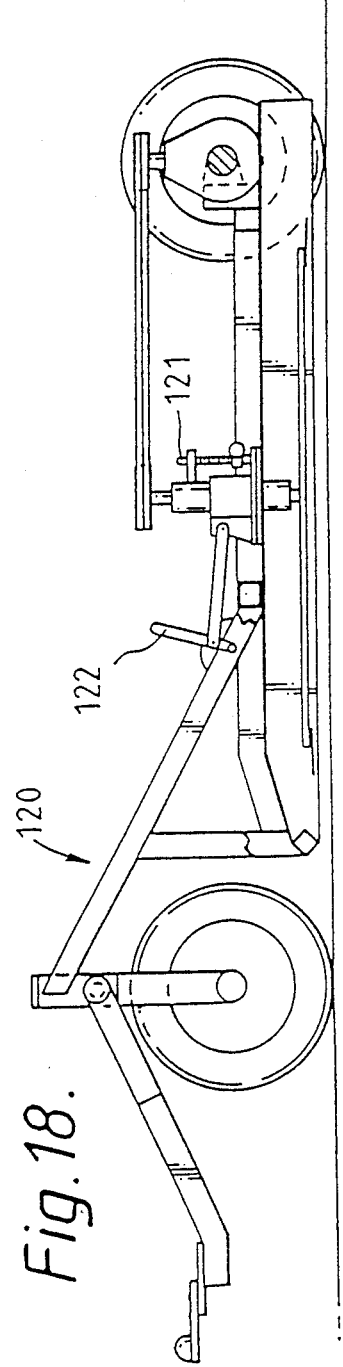
FIG. 18 is a side elevational view of an adjustable height mower according to yet another embodiment of the invention.

FIG. 18 illustrates another embodiment of the invention. Like the embodiment of FIGS. 15 to 17, the mower 120 of FIG. 18 is mounted on three wheels, namely a pair of fixed axis rear wheels and a front wheel which is steerable by the drawbar of the mower. Likewise, the mower 120 has a cutting blade mounted on a shaft which is rotated, via a belt and pulley drive, by the output or drive shaft of a gearbox which, in turn, is driven by the rear wheels. The mower 120 of FIG. 18 also has a cutting blade height adjustment mechanism 12 similar in design and operation to the cutting height adjustment mechanism 106 of the embodiment of FIGS. 15-17.

However, in the embodiment of FIG. 18, the driven shaft of the cutting blade is adjustably mounted on the housing of the mower so that its position can be varied in a direction transverse to its axis. This enables the mower 120 to incorporate a drive belt tensioning mechanism 122 as illustrated in FIG. 18.

The tensioning mechanism 122 comprises a lever connected to the shaft bearing housing of the cutting blade shaft. The tension of the drive belt between the driving and driven shafts can then be adjusted by means of the lever. A particular advantage of the tensioning mechanism is that the cutting blade can be placed in a neutral mode simply by moving the lever to remove or relax the tension in the drive belt. This is particularly useful when the mower 120 is travelling between work sites. To engage the cutting blade in an operational mode wherein it is driven by the wheels, the lever of the tensioning mechanism is simply pulled by the operator to tension the belt drive. The lever may suitably be operated from the towing vehicle by cable or other suitable mechanism.

The foregoing describes only some embodiments of the invention and modifications which are obvious to those skilled in the art may be made thereto without departing from the scope of the invention as claimed in the following claims. For example, the mowing apparatus may have more than one vertical shaft each having a cutting disc mounted thereto and each being driven by rotation of the wheels.

I claim:

1. Mowing apparatus for cutting grass or the like, the mowing apparatus being adapted in use to be pulled or pushed by a vehicle, comprising:
   a wheeled frame;
   a cutting member mounted for rotation about a generally vertical axis;
   drive means connected between at least one wheel of the wheeled frame and the cutting member whereby the cutting member is located by rotation of the wheel(s);
   wherein the cutting member comprises a central hub member, a plurality of equally spaced, generally flat, radial arm members having their inner ends connected to the hub member, each blade member having an upswept portion along its trailing edge such that a downward force is exerted on the blade when it rotates rapidly through air; and
   a plurality of connection members each connected between a respective pair of adjacent arm members and each being adapted to have a blade member connected thereto.

2. Mowing apparatus as claimed in claim 1, wherein the drive means includes a gearing mechanism such that the cutting member rotates faster than the wheel(s), the gearing mechanism having an input shaft driven from the wheel(s) and an output shaft on which the cutting member is mounted, the input and output shafts being mounted orthogonally to each other.

3. Mowing apparatus as claimed in claim 2, wherein the gearing mechanism is a differential from a motor car.

4. Mowing apparatus as claimed in claim 2, further comprising a clutch facility enabling the gearing mechanism to be placed in neutral mode.

5. Mowing apparatus as claimed in claim 1, further comprising means for adjusting the height of the cutting member.

6. Mowing apparatus as claimed in claim 1, wherein the wheeled frame comprises a pair of coaxial wheels on respective opposite sides of the frame, and the vertical axis of rotation of the cutting member is offset from the wheel axis such that the cutting diameter of the cutting member may exceed the wheel spacing.

7. Mowing apparatus as claimed in claim 1, wherein the drive means comprises a belt drive member.

8. Mowing apparatus as claimed in claim 7, wherein the belt drive mechanism comprises driving and driven pulleys and an endless belt mounted on the pulleys, the driving pulley being mounted on a shaft driven by the wheel(s) of the wheeled frame and the driven pulley being mounted on a shaft on which the cutting member is also mounted, further comprising means for adjusting the relative spacing between the pulleys.

9. Mowing apparatus as claimed in claim 1, wherein the wheels are toothed metal wheels.

10. Mowing apparatus as claimed in claim 1, wherein the cutting member comprises flexible filament grass cutters.

* * * * *